March 27, 1951  B. A. LENGYEL  2,546,160
PHOSPHORESCENT SCREEN FOR RADIO WAVE DETECTION
Filed Oct. 31, 1947
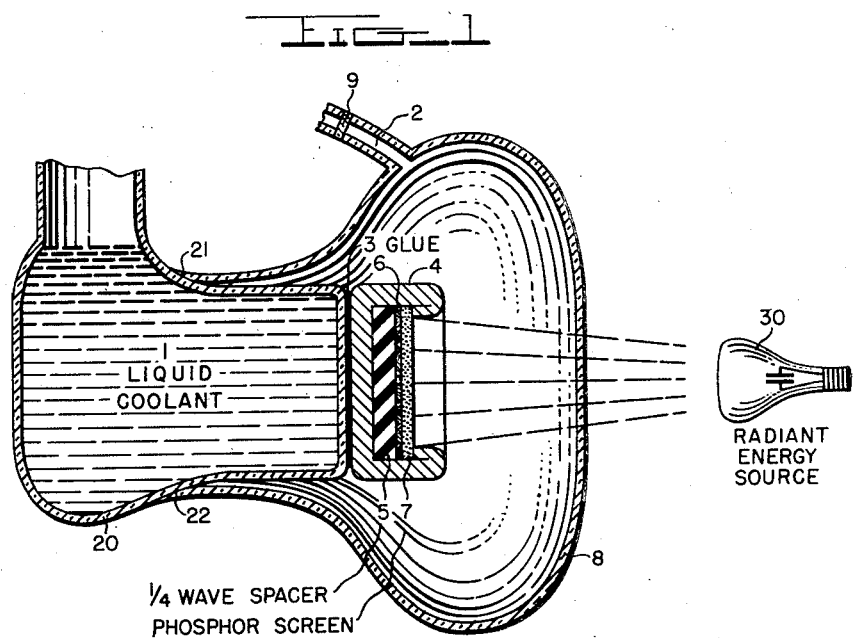
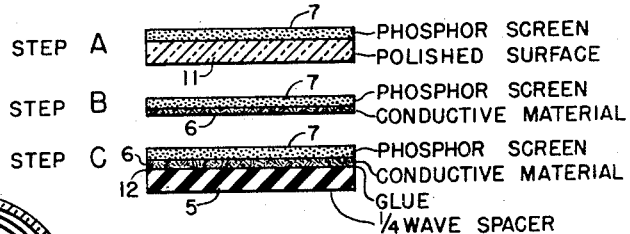
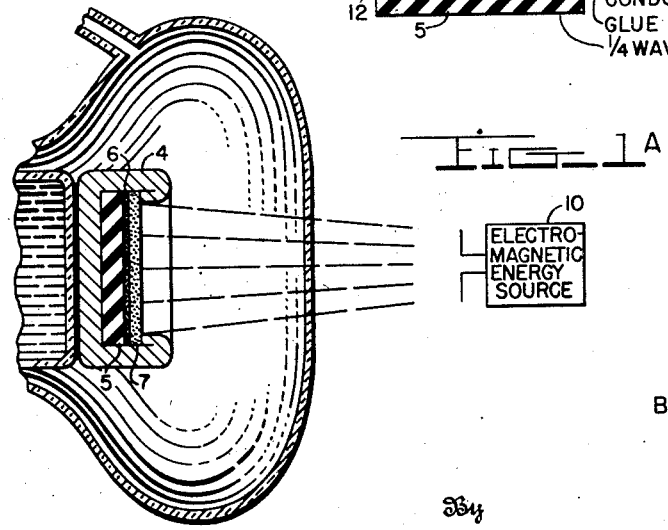
Inventor
BELA A. LENGYEL
By M. C. Hayes
Attorney Patented Mar. 27, 1951

2,546,160

UNITED STATES PATENT OFFICE 2,546,160

PHOSPHORESCENT SCREEN FOR RADIO WAVE DETECTION

Bela A. Lengyel, Washington, D. C.

Application October 31, 1947, Serial No. 783,423

3 Claims. (Cl. 250—1)

(Granted under the act of March 3, 1883, as amended April 30, 1928; 370 O. G. 757)

This invention relates in general to the detection of electromagnetic energy and in particular to methods and means for employing a phosphor storing screen for the detection of electromagnetic energy.

In particular I have discovered a means of utilizing electromagnetic waves and especially those waves in the microwave region as a source of stimulating energy to render phosphor luminescent.

Very briefly and in accordance with the spirit of my invention, the presence of electromagnetic energy is detected by first exciting a suitable phosphor screen from a source of radiant energy such as ultra-violet light. The phosphor screen is backed by or applied to a conducting surface and kept at a low temperature, in an evacuated chamber, to prevent the phosphor from emitting the stored radiant energy. Then after the phosphor screen has been suitably excited from a radiant energy storing source, exposure of the screen to electromagnetic energy will act to rerease the stored energy in the form of light. In particular, the electromagnetic energy striking the conducting surface on which the phosphor is applied is absorbed thereby and thus acts to heat the phosphor screen. The generated heat then causes the phosphor screen to glow. When the source of electromagnetic energy is removed the phosphor again cools, and the glow immediately disappears.

An object of this invention is to provide a new system of visibly detecting the presence of electromagnetic waves.

A further object of this invention is to provide a method and means for employing a phosphorescent screen for visibly detecting the presence of electromagnetic radiation.

Another object of this invention is to provide a new phosphor screen suitable for use in the detection of electromagnetic energy.

Other objects and features of the present invention will become apparent upon a careful consideration of the following detailed description, when read in conjunction with the accompanying drawing in which:

Fig. 1 and 1A is a cross-sectional view of one typical embodiment of the present invention.

Fig. 2 is a simple illustration of the process for preparing the phosphor screen for use in the invention.

Referring now in particular to Fig. 1 the embodiment illustrated therein comprises a phosphor storing screen 7, a suitable cup-shaped metallic supporting structure 4, therefor, a conducting backing 6 for the phosphor screen and a quarter wave insulating spacer 5. The metallic support 4, which may be formed from any suitable metallic material such as brass, bronze or aluminum, has its open end bent reentrantly in order to securely hold the phosphor screen and quarter wave spacer 5 in the proper position. The closed end of the support 4 is attached, such as by gluing, to a suitable bulbous shaped container 20, filled with a coolant to cool the phosphor storing screen and thereby prevent the latter from releasing energy stored therein except under the stimulus of electromagnetic energy impinging thereon. To thermally insulate the phosphor screen from the surrounding atmosphere, a suitable evacuated enclosure 8 made of glass or other substance easily penetrable by electromagnetic energy, is sealed at 21 and 22 to the container 20 and encompasses the phosphor screen.

In practice it is found that the coolant 1 may be, such as was used in this instance, a liquid consisting of solidified carbon dioxide dissolved in acetone ($CH_3COCH_3$). Any conventional means of refrigeration known to the art, may alternately be used. The envelope 8 is made of glass as a convenience of sealing the envelope over the glass container 20 for the coolant, and as a means of readily viewing the phosphor screen upon stimulation. Other types of envelopes 8 may be used such as metal or known plastics with the container 20 for the coolant, constructed of the same material, and a glass, or other transparent window cut therein for viewing the phosphor screen.

With the phosphor screen in its proper position as indicated at 7 and the glass envelope sealed at 21 and 22 to the container 20, the phosphor screen is excited by a source of radiant energy 30, such as an ultra-violet light, a mercury arc or sunlight, causing the phosphor electrons to leave their low energy states and to become entrapped in metastable states. The phosphor screen is then cooled to the temperature of the coolant, or until the glow visually disappears, to prevent the electrons from being released from their metastable states, thereby preventing the phosphor from emitting the stored energy. The process of cooling the phosphor screen 7 takes place partly by radiation, and partly by conduction and convection through the air or other gas present in the container. The glass envelope 8 is partially evacuated to approximately 5 mm. Hg through the outlet at 2 with a standard vacuum pump for the reduction of heat exchange by direct conduction and convection. The excited electrons of the cooled phosphor remain in their metastable states until they are stimulated by heat or a source of radiation. Fig. 1A illustrates heating the phosphor screen through a source of electromagnetic energy. When incoming electromagnetic waves from source 10, of Fig. 1A, and in particular those in the microwave region, known to the art of having a wave length of 10 centimeters or less, strike the conductive backing 6 applied to the phosphor, the conducting backing absorbs the energy and thus acts to heat the phosphor screen. When the phosphor is heated the electrons are released from their metastable states, to then return to their low energy states and in transition emit light. When the source of microwaves, or other electromagnetic waves is removed the phosphor again cools and immediately ceases to glow. The metallic supporter 4 also acts in the capacity of an electrical reflector, that is, a portion of the electromagnetic waves pass through the conductive backing 6 and are reflected from the closed end of the supporter 4 back to the conductive backing 6 thereby permitting the conductive backing 6 to absorb a greater portion of the electromagnetic energy. To improve the utilization of the incident electromagnetic energy reflecting from the supporter 4, it has been found that the maximum reflection occurs when the conductive backing 6 is positioned an electrical quarter wave length or odd multiple thereof of the incoming frequency away from the metallic supporter 4.

The construction of the phosphor screen 7 employed, in the system of detection of electromagnetic energy, is not critical. I have found, however, that by using the combination of elements, and the procedure of steps A, B and C illustrated in Fig. 2, to have certain advantages and features which render it more suitable to this invention. In particular, a phosphor composition is prepared, comprising in a specific case a mixture of 3 parts by volume of phosphor mixed with 1 part by volume of plastic binder. In this instance the plastic binder consisted of 2 parts by volume of methacrylate resin dissolved in 3 parts by volume of ethylene dichloride or acetone. Any standard phosphor has the ability of storing radiant energy and emitting light when stimulated by heat, but certain phosphors, as lead, copper or silver activated ZnS or ZnCdS have proven to be particularly suitable to this invention. The phosphor composition is then applied, either with a brush, a spray gun, or rolled on, as step A of Fig. 2 indicates, to a polished flat surface, that can either be nickel plated brass, glass or mercury. An alternative method is to apply the dissolved plastic binder on the polished surface and then sprinkling the phosphor powder on the dissolved binder. A thickness of about .01 cm., of the phosphor composition, was found sufficient to render the phosphor sensitive to electromagnetic energy and suitably thick to maintain uniformity of glow. The minimum diameter of the phosphor screen is, in general, equivalent in size to one electrical wave length of the incoming frequency to be detected. When the phosphor composition has hardened it is removed from the polished surface with a sharp instrument, such as a knife, and coated with a conducting backing, step B of Fig. 2. Such backing can be either colloidal graphite, evaporated aluminum or nickel, or any other known suitable material. To render the conducting backing 6 absorbent to electromagnetic energy, it should be applied sufficiently thick until the electrical resistance of the surface of the conducting backing 6 is in the order of 400 ohms, or more. After the conducting backing has dried it is fastened to a plastic spacer 5, step C of Fig. 4, with the same adhesive as used for the binder in the phosphor. The plastic spacer 5 can either be phenol formaldehyde, methyl methacrylate or any other suitable nonconductive dielectric material. Since the phosphor screen is cooled by radiation through the spacer, the same is made of a honeycomb material or other means of air gaps. The thickness of plastic spacer 5, to improve the utilization of the incident electromagnetic waves reflecting from the metallic supporter 4 back to the conductive backing, should be electrically one quarter wave length of the incoming frequency, and have a diameter similar to that of the phosphor screen.

Although I have shown and described only a certain and limited embodiment of the invention, it must be understood I am fully aware that many modifications are possible thereof without departing from the spirit of the invention as defined in the appended claims.

The invention described herein may be manufactured and used by or for the Government of the United States of America for governmental purposes without the payment of any royalties thereon or therefor.

What is claimed is:

1. The method of detecting an incident radio wave with a phosphor sheet comprising cooling the phosphor, exciting the phosphor with ultraviolet light, receiving the incident radio wave at one surface of the phosphor, partially absorbing the radio wave adjacent the other face of the phosphor, resonantly generating a standing radio wave at the said other face with the portion of the wave energy not absorbed to effect further absorption of the wave energy, thereby causing the phosphor to glow.

2. Means for visually indicating an incident radio wave comprising a flat conductive member operative to reflect a radio wave, a low radio frequency loss dielectric spacer overlying the conductive member and having a thickness equal to an odd multiple quarter wave length of the radio wave, a thin electrically resistive sheet overlying the spacer operative under an incident radio wave in part to absorb and in part to transmit the same, and a phosphor screen supported in contact with the resistive sheet operative to be activated responsively to ultraviolet radiation for fluorescence in dependency on the incidence of radio waves of whose length the spacer thickness is an odd quarter wave multiple.

3. The structure defined in claim 2 wherein the spacer is of honeycomb construction.

BELA A. LENGYEL.

REFERENCES CITED

The following references are of record in the file of this patent:

UNITED STATES PATENTS

| Number | Name | Date |
|---|---|---|
| 1,532,782 | Shepard et al. | Apr. 7, 1925 |
| 2,074,226 | Kunz et al. | Mar. 16, 1937 |
| 2,128,234 | Dallenbach | Aug. 30, 1938 |
| 2,207,656 | Cartwright | July 9, 1940 |
| 2,225,044 | George | Dec. 17, 1940 |
| 2,372,359 | Cook | Mar. 27, 1945 |
| 2,420,168 | Dimmick | May 6, 1947 |
| 2,421,912 | Spooner | June 10, 1947 |

OTHER REFERENCES

Standard Handbook for Electrical Engineers, A. E. Knowlton, Smith Edition, August 1941.